United States Patent [19]

Harrigan

[11] 4,058,926
[45] Nov. 22, 1977

[54] WEIGHT FOR SPIN CASTING

[76] Inventor: Roy M. Harrigan, Bromley Mountain Road, Manchester, Vt. 05254

[21] Appl. No.: 642,565

[22] Filed: Dec. 19, 1975

[51] Int. Cl.² .............................................. A01K 95/00
[52] U.S. Cl. .................................................. 43/43.12
[58] Field of Search ............................. 43/43.12, 43.13

[56] References Cited
U.S. PATENT DOCUMENTS

| 2,230,751 | 2/1941 | Johnson | 43/43.12 |
| 2,687,592 | 8/1954 | Purcell | 43/43.12 |
| 2,741,059 | 4/1956 | Ostrowski | 43/43.12 |

Primary Examiner—Russell R. Kinsey
Assistant Examiner—Daniel J. Leach
Attorney, Agent, or Firm—Robert S. Smith

[57] ABSTRACT

A weight for use in casting with spinning type fishing tackle. In one form the weight has a generally arcuate shape and a hook disposed at one axial extremity thereof for releasably engaging the associated fishing line.

3 Claims, 4 Drawing Figures

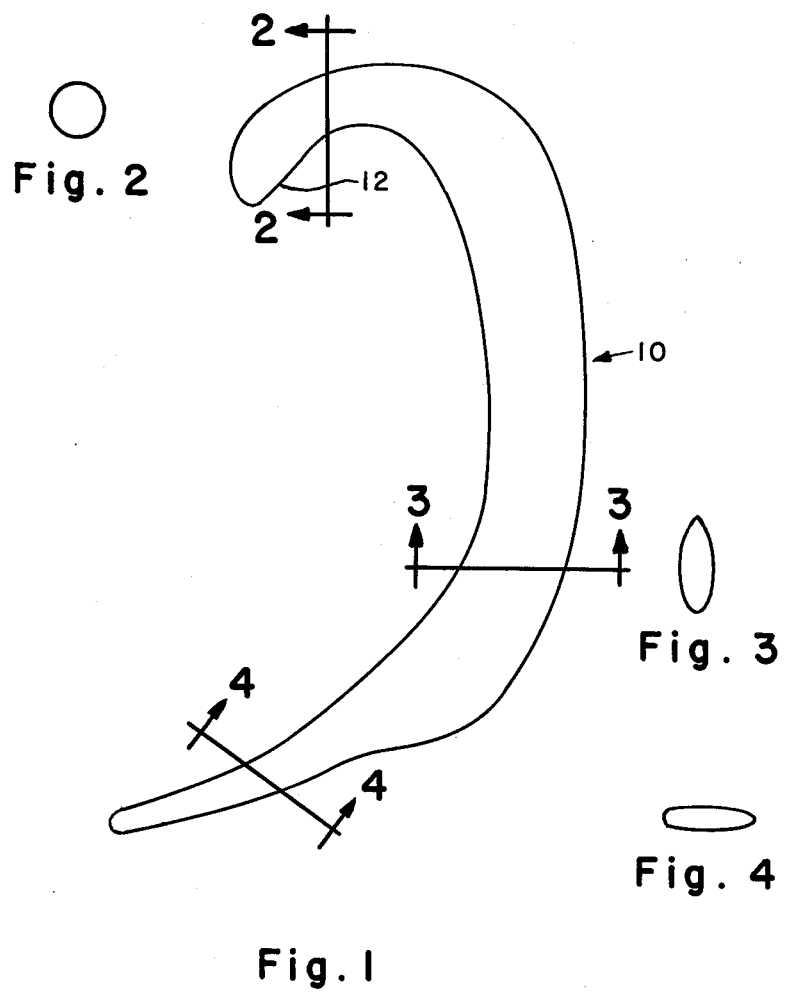

WEIGHT FOR SPIN CASTING

BACKGROUND OF THE INVENTION

The invention relates to fishing gear and particularly to spinning type apparatus. Prior art fly fishing apparatus utilizes a line having a relatively large mass together with a fishing rod which is employed with a specialized technique for casting a fly onto or into a body of water. Such techniques are not suitable for use with spinning equipment because the mass of the line is not sufficient for casting flys and the like. In addition the bulk of the line typically used for fly fishing is undesirable since it is prejudicial to the necessary smooth flow of line from the spinning reel spool. Lines typically used for spinning are nylon monofilament of small diameter. Prior art apparatus has included various weights which have been fixed to the fishing line. In one form of a spherical plastic body is fixed to the line which has a removable plug. The body may be filled with varying amounts of water which will control whether the sphere will float or sink when cast upon the water.

One problem associated with such fixed weights which are normally fixed to the line relatively close to the end thereof, is that a substantial amount of noise and wake are produced by the weight not only upon impact with the water but also if the line is manipulated to impart motion to a fly or other bait. The latter aspect is particularly acute when it is desired to use a dry fly which floats uon the surface of the water. It will be seen that a floating mass disposed in proximity to the dry fly will produce a substantial amount of wake not only because of its shape but because of its necessary position proximate to the fly. Those skilled in the art will understand that dry flies float on the surface of water due to surface tension and that once the dry fly is pulled under the water that it will no longer float.

It is an object of the invention to provide apparatus which will allow the use of spinning tackle to cast dry flies, wet flies and live bait and which will have a minimum sound and wake produced during the cast.

It is a further object to provide such apparatus which will not tend to drag a dry fly beneath the surface of the water.

It is another object of the invention to provide such apparatus which will allow movement of the fly or other bait after the cast with a minimum amount of wake being produced.

SUMMARY OF THE INVENTION

In one form of the invention a weight for casting with fishing tackle is provided which includes a quantity of material and means for selectively engaging and disengaging the mass to an associated fishing line. The means for disengaging is responsive to forces associated with water contact of the mass.

In one form the material may be clay. The quantity of material may comprise a generally arcuate member disposed in a first plane and the means for selectively engaging and disengaging may comprise a hook disposed at one axial extremity of the arcuate member which is also disposed in the same plane. Means responsive to impact with or penetration into the water may include an axial section of the arcuate member remote from the hook having a dimension perpendicular to the plane which is greater than the dimension thereof parallel to the plane. The apparatus may also be provided with an intermediate axial section disposed between the axial extremities thereof which has a dimension parallel to the plane which is greater than the dimension perpendicular to the plane.

BRIEF DESCRIPTION OF THE DRAWING

The invention will be better understood by reference to the accompanying drawing in which:

FIG. 1 is a side elevational view of the apparatus in accordance with the invention.

FIGS. 2, 3 and 4 are sectional views taken through the correspondingly numbered section lines of FIG. 1.

DESCRIPTION OF THE PREFERRED EMBODIMENT

Referring now to FIGS. 1, 2, 3 and 4, there is shown an arcuate member 10 having a hook 12 disposed at one axial extremity thereof. The member may be manufactured of any cohesive malleable material having significant mass. Lead has been typically used for fishing weights and it is acceptable to use lead for this application although it is more ecologically desirable to use a substance such as clay which will not be objectionable when left at the bottom of a body of fishing water. The member 10 in the preferred embodiment has in one form axial sections of differing cross-sections. It will be understood that the axis of the arcuate member is disposed normally in a single plane. As seen in FIG. 4 the cross-section of the axial extremity of the member 10 most remote from the hook 12 will have a dimension perpendicular to the plane which is greater than the dimension thereof parallel to the plane. The axial section of the arcuate member intermediate the two axial extremities perferably has a dimension parallel to the plane which is greater than the dimension perpendicular to the plane, as best seen in FIG. 3. The cross-section of the member 10 at the hook 12 may be circular as seen in FIG. 2.

In operation, the 12 hook is engaged with a loop in or attached to the associated fishing line and the arcuate member and the line is cast toward the water. In some cases as when using a dry fly the loop is located two to three feet from the dry fly. When a cast is made the weight goes foremost through the air with the dry fly following. The axial extremity of the arcuate member remote from the hook will strike the water first since it is affected by gravity which will tend to make it hang downward from the loop on the line. As the weight 10 penetrates the water it rotates due to its design and immediately disengages from the line. Then the dry fly will slowly settle onto the surface of the water. More specifically, the contour of the member 10 which includes a relatively narrow edge at the axial extremity most remote from the hook 12 will strike the water and because of its contour enter readily. Also because of the contour of the intermediate section the member 10 will be deflected in a manner which will disengage the hook from the loop.

Having thus described my invention, I claim:

1. A weight for casting with fishing tackle which comprises: a quantity of material and means for selectively disengaging said material from an associated fishing line, said means for disengaging being responsive to forces associated with casting said weight, said quantity of material comprises a generally arcuate member having an axis disposed in a first plane and said means for selectively disengaging comprises a hook disposed at one axial extermity of said arcuate member, said hook and said axis being disposed in the same plane.

2. The apparatus as described in claim 1 wherein said means is responsive to impact with the water includes an axial section of said arcuate member remote from said hook having a dimension perpendicular to said plane greater than the dimension thereof parallel to said plane.

3. The apparatus as described in claim 2 further including an axial section intermediate said hook and said remote axial section wherein the cross-section of said arcuate member has a dimension parallel to said plane which is greater than the dimension perpendicular to said plane.

* * * * *